United States Patent Office

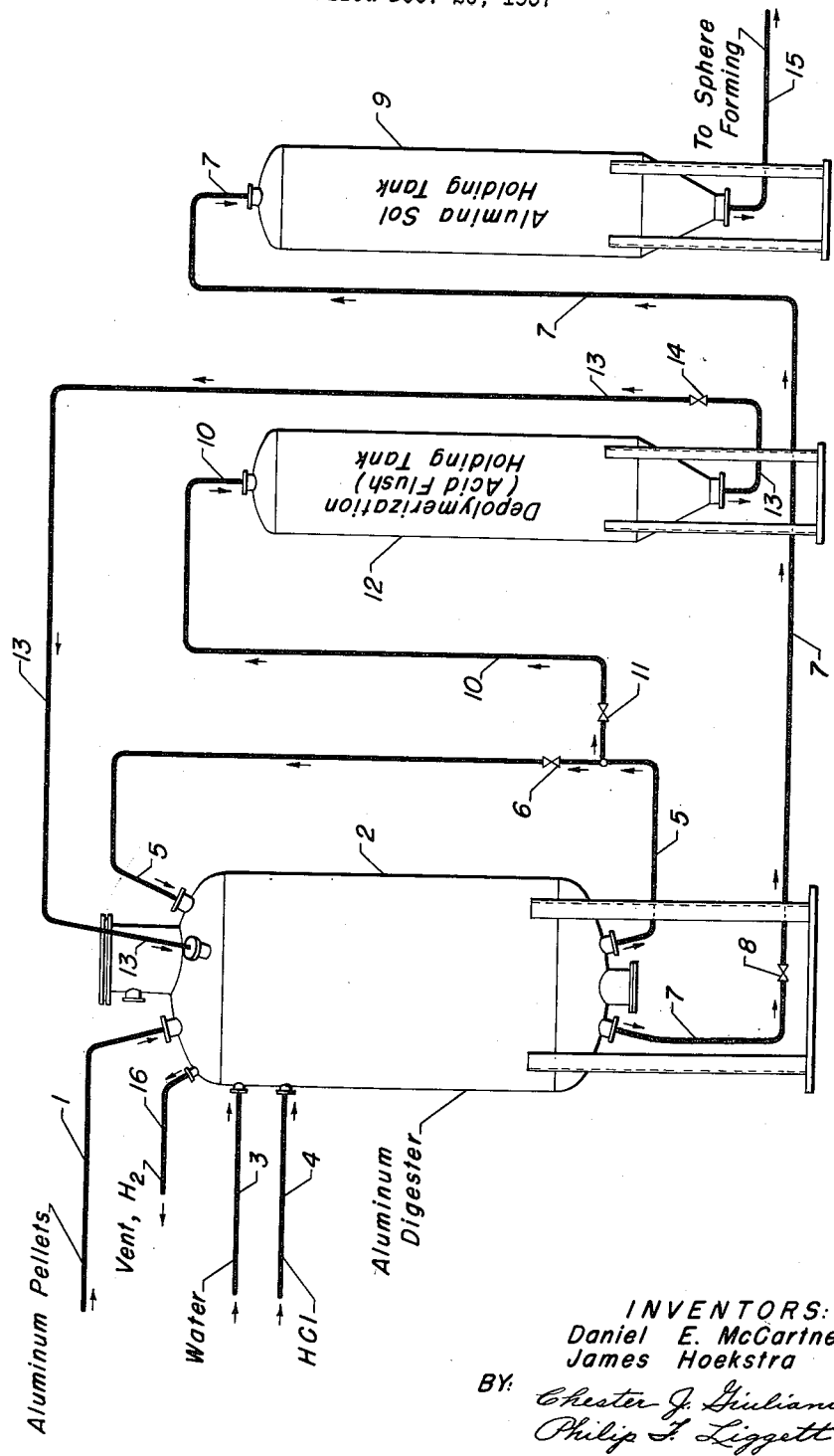

3,020,242
Patented Feb. 6, 1962

3,020,242
ALUMINA SOL MANUFACTURE
Daniel E. McCartney, Mount Prospect, and James Hoekstra, Evergreen Park, Ill., assignors, by mesne assignments, to Universal Oil Products Company, Des Plaines, Ill., a corporation of Delaware
Filed Dec. 20, 1957, Ser. No. 704,102
13 Claims. (Cl. 252—442)

The present invention relates to the manufacture of alumina sol containing combined chloride, and is more specifically directed to improvements in the method for manufacturing an alumina sol wherein particles of metallic aluminum are dissolved in concentrated hydrochloric acid.

Alumina sol is employed almost exclusively in serving a single purpose—the manufacture of alumina (in the form of a highly refractory oxide material). Alumina, however, is employed, in and of itself, in performing a multitude of functions: as porous aluminum oxide, it is widely utilized throughout the petroleum and chemical industries. Alumina is employed as a dehydrating, treating or purifying agent, and is often combined with one or more other refractory metal oxides such as silica, zirconia, titania, strontia, etc. Various physical modifications of alumina, known as activated alumina or activated alumina of commerce are especially employed to take advantage of their unusually high adsorptive capacity and pronounced catalytic activity. Aluminum oxide is perhaps most widely employed as a carrier material in the manufacture of catalytic composites containing one or more highly active metallic components, and non-metallic, catalytically active components.

An alumina sol may be converted into aluminum oxide in many ways, virtually all of which require the gelation of the sol into a firm alumina hydrogel which upon drying and calcining and other miscellaneous processing steps, is converted into aluminum oxide. Alumina exists in many sizes and shapes, the latter generally being dependent upon the use for which the alumina is intended. A particularly preferred form of alumina is the sphere, and alumina spheres may be manufactured continuously by passing droplets of a suitable alumina sol into an oil bath maintained at an elevated temperature. The droplets are retained in said oil bath until such time as they set to firm hydrogel spheroids. These spheroids are continuously withdrawn from the oil bath, and immediately thereafter, subjected to specific aging treatments for the purpose of imparting thereto certain desired physical characteristics. The spheres are subsequently dried at a temperature of from about 100° F. to about 400° F., and calcined at elevated temperatures, generally within the range of from about 800° F. to about 1400° F.

As hereinbefore set forth, alumina is extensively employed in the manufacture of catalytic composites, particularly those catalytic composites utilized in the petroleum industry for the reforming of hydrocarbons. These catalysts are often manufactured to contain chlorine and/or fluorine, which components are thought to exist within the catalyst in some combined form, to impart a desired degree of acidity to the final catalyst for the purpose of selectively promoting particular reactions. Although the addition of either chlorine or fluorine may be effected in any suitable manner, such as by treating calcined alumina with hydrochloric acid, hydrofluoric acid, or volatile salts such as ammonium chloride and ammonium fluoride, a convenient method of compositing the chloride is afforded when the alumina is produced from an alumina sol resulting from the interaction of hydrochloric acid upon aluminum. Where necessary, additional chloride and the desired quantity of fluoride may be deposited as hereinabove described, or, conversely, the chloride concentration may be lowered through some simple treatment, such as steaming the finished alumina.

An object of the present invention is to produce an alumina sol which may be advantageously utilized in the manufacture of alumina, particularly alumina which is ultimately employed in the manufacture of catalytic composites, and which alumina contains combined chloride.

Regardless of the ultimate size and shape, and/or utilization of the alumina produced from alumina sol, the alumina generally undergoes many processing operations prior to attaining a finished state. This is particularly true in situations where the alumina is not employed as such, but is combined with other materials, as in the manufacture of catalytic composites. It is, therefore, essential that the alumina possess substantial resistance to undue wear resulting from abrasion, chipping, crushing, erosion, etc., in order to prevent substantial loss of the alumina during the various processing operations. A desired physical characteristic of alumina is, therefore, a high degree of crushing strength, as a result of which only slight loss of the alumina is incurred during the multifarious processing operations. It is, therefore, another object of the present invention to produce an alumina sol which yields an unfinished alumina particle possessing a high degree of resistance to crushing and abrasion by virtue of its unusually high crushing strength.

In one embodiment, the present invention provides an improvement in the process for the manufacture of an alumina sol containing combined chloride, in which process aluminum is contacted with concentrated hydrochloric acid in an aluminum digestion zone, forming thereby alumina sol and high molecular weight sol polymers, which improvement comprises recovering alumina sol from undissolved aluminum particles and high molecular weight sol polymers within said digestion zone, commingling therewith hydrochloric acid at a rate in excess of that required to maintain the aluminum/chloride ratio of the resulting alumina sol below a level of about 0.3 for a period of from about 1 to about 6 hours, and circulating the resulting solution through said digestion zone at sol-forming conditions.

In another embodiment, the present invention provides an improvement in the process for the manufacture of an alumina sol containing combined chloride, in which process aluminum is contacted with concentrated hydrochloric acid in an aluminum digestion zone, forming thereby alumina sol and high molecular weight sol polymers, which improvement comprises recovering alumina sol from undissolved aluminum particles and high molecular weight sol polymers within said digestion zone, separately removing said sol polymers with an acid-flush solution into a depolymerization zone, adding aluminum particles to said digestion zone, commingling therewith the depolymerization reaction products, from said depolymerization zone, at a rate in excess of that rate which is required to maintain the aluminum/chloride weight ratio of the resulting alumina sol at a level below about 0.3 for a period of from about 1 to about 6 hours and circulating the resuling solution, at sol-forming conditions, until the aluminum concentration of the circulating stream attains a level of about 13% to about 15% by weight.

In a more specific embodiment, the present invention affords a process for the manufacture of alumina having a crushing strength within the range of from about 65 to about 130 grams prior to being dried and calcined at elevated temperatures, which comprises contacting metallic aluminum with concentrated hydrochloric acid in a digestion zone, recovering alumina sol from undissolved aluminum and high molecular weight sol polymers within said digestion zone, separately recovering said sol polymers with an acid-flush solution of concentrated hydrochloric acid in a depolymerization zone, adding additional aluminum to said digestion zone, commingling therewith the depolymerization reaction products, from said depolymerization zone, at a rate in excess of that rate which is required to maintain the aluminum/chloride weight ratio of the resulting alumina sol at a level below about 0.3 for a period of about 3 hours, circulating the resulting solution through said digestion zone at sol-forming conditions, continuing said circulation until such time as the aluminum concentration of the circulating solution attains a level of about 13% to about 15% by weight of said solution, recovering the resulting alumina sol free from said sol polymers and forming said alumina sol into alumina particles having a crushing strength of from about 65 to about 130 grams.

It is recognized that processes for manufacturing an alumina sol, utilizing the method which comprises contacting metallic aluminum with concentrated hydrochloric acid, are rather well defined in the prior art. Such a process is generally effected in a batchwise operation, as distinguished from a continuous operation. To illustrate the commercial operation, as presently practiced, an excess of metallic aluminum is charged into a suitable digestion zone, water and concentrated hydrochloric acid are added thereto, and the resulting solution circulated therethrough until the circulating solution contains a quantity of dissolved aluminum in excess of that ultimately desired in the final alumina sol. This solution is removed from the digestion zone, and the concentrations of aluminum and combined chloride contained therein are adjusted to predetermined, desired amounts through the addition of hydrochloric acid and water. Experience has indicated that about 5% to about 10% by weight of the total alumina sol produced is retained in the digestion zone by the undissolved metallic aluminum.

The above-described process of manufacturing an alumina sol inherently offers disadvantages in several respects. The process is unduly tedious and difficult, and of greater import, yields an alumina sol which may not produce an alumina suitable for utilization as hereinbefore set forth. For example, the addition of large quantities of water and additional acid, for the adjustment of the aluminum and chloride concentrations, must of necessity be performed with the exercise of great care, since too little, or conversely, too much of either water or the acid, adversely affects the composition of such sol. A finished alumina sol results which does not contain a sufficient concentration of aluminum, and, therefore, is lacking in acceptable alumina-forming properties. That is, the alumina ultimately produced possesses poor physical characteristics as to crushing strength and uniformity of composition, particle to particle. Further, no provision is made in this process for the total removal of alumina sol from the digestion zone. Thorough washing of the remaining contents thereof is insufficient to remove the high molecular weight sol polymers which are formed as a result of the action of alumina sol which remains in intimate contact with aluminum. These resulting sol polymers become more difficult to remove from the undissolved aluminum with each successive operation, and, as a result, there is formed long-chain sol polymers having molecular weights in excess of 1000, and often in the class of 2,000 to 10,000 or more. Eventually, at least a portion of these high molecular weight sol polymers are introduced into the alumina sol produced, and result in an alumina sol which varies markedly in appearance characteristics, such as color, translucence, etc. Also, the inclusion of high molecular weight sol polymers in an alumina sol results in a sol which has the tendency to stratify into several distinct layers. Such stratification is indicative of a nonhomogeneous alumina sol, and produces an alumina which is non-uniform as to composition and/or physical characteristics.

The method of the present invention affords substantial improvement in the manufacture of an alumina sol for particular utilization in the production of alumina. This improvement effects substantially complete destruction of the high molecular weight sol polymers into suitable alumina sol, and produces a sol having uniform physical and appearance characteristics. Alumina produced from an alumina sol manufactured in accordance with the present invention possesses uniform physical properties, and homogeneity of composition particle to particle. Further, the alumina particles, produced thereby, possess an unusually high degree of crushing strength whereby they offer a greater degree of resistance to abrasion, chipping, crushing, etc., during the subsequent processing procedures.

Briefly, the method of the present invention, which produces an alumina sol substantially free from long-chain, high molecular weight sol polymers, comprises charging an excess of aluminum into a suitable digestion zone and adding thereto a solution consisting of a predetermined quantity of hydrochloric acid and water, and containing the reaction products of depolymerized sol polymers. The aluminum employed in the method of the present invention may be any available type of commercial aluminum, although if a high purity alumina sol is desired, it is preferred to employ high purity aluminum. The present process will produce a very pure alumina, chloride sol through the utilization of metallic aluminum of at least 99.5% by weight purity. As hereinafter set forth, it is desired that the reaction proceed at a comparatively slow rate for a short initial period. A rapid reaction rate is facilitated by impure aluminum, and, therefore, aluminum of at least 99.95% is particularly preferred.

The degree of subdivision of the alumina is a factor which determines the rate of the reaction, and the smaller the size of the particles, the greater the surface area of alumina exposed, and, therefore, the more rapid the reaction with concentrated hydrochloric acid. Powdered aluminum is suitably utilized as the starting material, and aluminum turnings or granulated aluminum may also be employed. Aluminum pellets, however, which have been prepared by dropping molten aluminum into water, have proven highly satisfactory for producing the alumina sol, those pellets of about ¼″ to about ½″ in diameter being preferred. Powdered aluminum and aluminum pellets below about ¼″ in diameter are generally to be avoided due to the vigorous reaction which results. Also, as hereinafter set forth, it is preferred that the reaction proceed at a comparatively slow rate for an initial period of about 1 to about 6 hours.

We have found that a hydrochloric acid solution containing about 30% to about 35% by weight hydrogen chloride is very suitable for use in the present invention, and lower or higher concentrations may be employed to advantage. However, extremely high concentrations are generally avoided due to the difficulty in handling and metering the same, and from the standpoint of the safety measures involved. Lower concentrations of hydrochloric acid tend to extend the period of time expended in the operation, and do not generally lend themselves to the dissolution of large quantities of aluminum.

The rate of acid addition is, however, essential to the method of the present invention, and it is preferred that the acid addition into the digestion zone exceed that amount which is required to maintain the aluminum/chloride weight ratio in the resulting alumina sol at a level below about 0.3 for a period of about 1 to about 6 hours, and preferably about 3 hours. This procedure insures the presence of an excess of hydrochloric acid for a period of time sufficient to further break down any high molecular weight sol polymers which remain from the last previous operation. As the hydrochloric acid concentration is decreased, through the dissolution of aluminum, the opportunity for the destruction of the high molecular weight sol polymers is substantially diminished.

The circulation, through the material contained within the digestion zone, is continued until such time as the aluminum content of the circulating solution is about 13% to about 15% by weight. The circulating solution, or alumina sol at this stage of the operation, is removed to a holding tank or suitable container serving as storage for charging the alumina sol to the alumina-forming process. An amount of water, sufficient to lower the aluminum concentration of the alumina sol in the holding tank to the predetermined desired amount, is added to the digestion zone for the purpose of removing therefrom the suitable alumina sol retained by the undissolved aluminum particles. As hereinbefore set forth, this quantity of water is insufficient in amount, and does not possess the necessary properties, to remove the high molecular weight sol polymers from the undissolved aluminum particles. Therefore, the predetermined quantities of water and concentrated hydrochloric acid to be employed in the next succeeding batch operation are circulated in the aluminum digester, prior to the addition of fresh aluminum particles, for a period of about one hour, removing thereby the high molecular weight sol polymers. The resulting solution, hereinbefore and hereinafter referred to as an acid-flush solution, containing the sol polymers, is passed into a depolymerization zone and maintained therein during the addition of fresh aluminum pellets to the digestion zone, in which period of time there occurs at least a partial depolymerization of the sol polymers. After the addition of the fresh aluminum pellets to the digestion zone, the acid-flush solution, containing the depolymerized products of the sol polymers, is added thereto, and the resulting solution circulated as hereinabove described. It is within the scope of the present invention that the digestion zone serve as the depolymerization zone, in which case, the fresh aluminum particles are added to the digestion zone, and the acid commingled therewith at a rate to maintain the aluminum/chloride weight ratio in the resulting alumina sol at a level below 0.3 for a period of about 1 to about 6 hours.

A natural consequence of the method of the present invention is the production of a substantially pure stream of hydrogen. It is, therefore, possible that the digestion zone be maintained under an imposed pressure, although atmospheric pressure may be employed, through the utilization of a suitable pressure control valve situated in the line through which the hydrogen is removed. Since it is preferred that the method of the present invention be effected in a liquid phase, pressures above atmospheric pressure may be employed in those instances where the operating temperature exceeds 212° F., the boiling point of water. Therefore, the digestion zone will have imposed thereon an atmosphere of hydrogen equivalent to a pressure within the range of about 5 to about 35 p.s.i. It is understood that the process of the present invention may employ atmospheric conditions of pressure and temperature. However, temperatures within the range of about 80° F. to about 300° F. exhibit additional benefits, and are, therefore, generally preferred. Where the temperature employed exceeds the boiling point of water, it will be necessary to utilize sufficient pressure to maintain water in the liquid state.

The novelty and utility of the method of the present invention is further illustrated, and clearly ascertained through reference to the accompanying drawing. It is not intended, however, that the present invention be limited unduly to the particular system illustrated. Modifications to the equipment, and variations in the process, will become apparent through reference to the drawing as well as to the specification and examples hereinafter set forth. In the interest of simplicity, various controls, heaters, coolers, most valves, sample taps, and other similar refinements have been either limited in a drawing, or entirely omitted therefrom. These items are well known and evident to one skilled in the art, and need not necessarily be illustrated or described with great detail. The process may be operated at any suitable temperature and pressure, and may utilize any suitable equipment upon which concentrated hydrochloric acid exerts no deleterious effect.

With reference to the drawing, aluminum pellets of from about ¼" to about ½" in diameter (from a suitable feed hopper not illustrated) are fed through line 1 into aluminum digester 2, which digester contains undissolved particles of aluminum pellets from the immediately preceding operation. The contacts of acid-flush holding tank 12, which contents are hereinbelow described, are then added to digester 2 through line 13 containing valve 14. Immediate circulation of the resulting solution through the material contained within digester 2 is started through line 5 containing valve 6, valve 11 being closed at this time, and such circulation is continued until the aluminum concentration of the circulating stream is about 13% to about 15% by weight. When the aluminum concentration in the circulating stream contained in line 5 attains a level of about 13% to about 15%, valve 6 is closed, valve 8 is opened and the resulting alumina-sol solution is passed through line 7 into alumina-sol holding tank 9.

Valve 8 is then closed, valve 6 is opened, and 100% by weight of the water required to lower the aluminum concentration of the alumina-sol in holding tank 9 to the desired level, preferably about 12% by weight, is added through line 3 to an aluminum digester 2. The water is circulated through the digester via line 5, removing thereby residual alumina-sol from the surface of the unreacted aluminum pellets, and is subsequently removed to the alumina-sol holding tank 9 via line 7 containing valve 8.

The required quantities of water and hydrochloric acid for the next succeeding operation are added to digester 2 through lines 3 and 4 respectively, and immediately circulated through line 5 containing valve 6. This highly concentrated hydrochloric acid solution absorbs the high molecular weight sol polymers remaining in digester 2, and the resulting mixture is passed through line 10 containing valve 11 (valve 6 being closed at this time) into acid-flush holding tank 12. Fresh aluminum pellets are then added to digester 2 through line 1 and depolymerized contents of acid-flush holding tank 12 are passed through line 13 containing valve 14 into digester 2. The contents of the acid-flush holding tank are added to the digester at a rate such that the weight ratio of aluminum to chloride in the resulting alumina sol is maintained at a level below about 0.3 for the initial period of about 3 hours.

When the imposition of pressure upon aluminum digester 2 is required, a suitable pressure control valve is installed in line 16 through which the excess hydrogen is removed. The alumina-sol contained in holding tank 9 is charged through line 15 to the process employed for the formation thereof into alumina.

The following examples are given to further illustrate the method of the present invention, and to indicate the benefits afforded through the utilization thereof. It is not intended that the broad scope of the invention be limited unduly to the concentrations and conditions employed therein.

EXAMPLE I

To 9000 pounds of undissolved aluminum pellets, contained in a digester vessel, was added 1800 pounds of fresh aluminum pellets of high purity (greater than 95% by weight aluminum) and from about ¼" to about ½" in diameter. Deionized water, and a 32½% by weight hydrochloric acid solution, was added thereto in amounts of 7480 pounds and 4150 pounds respctively. The water was added at the rate of 375 pounds per minute, and the hydrochloric acid at the rate of 12.9 pounds per minute, or 0.0012 pound of acid per minute per pound of aluminum contained in the digester. The resulting solution was circulated through the digester until such time as the aluminum concentration in the circulating stream was of the order of about 13% to about 15% by weight of the total solution.

The solution was removed from the digester to a holding tank, and sufficient water and hydrochloric acid added thereto to adjust the concentration of aluminum in the alumina-sol and the aluminum/chloride weight ratio to the predetermined, respective amounts.

The alumina-sol produced as hereinabove described, which method is commonly employed in the commercial manufacture of alumina, exhibited the tendency to stratify into several layers, the bottom one of which visually indicated the presence of a solid, white, fluffy material. As hereinbefore set forth, the non-homogeneity of the alumina-sol produced is believed to be due to the formation of sol polymers of high molecular weight. This type of alumina-sol, when utilized in the formation of spherical particles (formed by the oil-drop method hereinbefore described) yielded wet spheres having a crushing strength varying between about 45 to about 60 grams. Data representing this operation are given in the following table under the designation "run A."

Table I

| Run Designation | A | B |
|---|---|---|
| Aluminum Added Per Run, Lbs | 1,800 | 1,072 |
| Undissolved Aluminum in Digester, Lbs | 9,000 | 7,000 |
| Total Aluminum in Digester, Lbs | 10,800 | 8,072 |
| Water Added, Lbs | 7,480 | 3,583 |
| Water Addition Rate, Lbs./Min | 375 | 90 |
| 32% Hydrochloric Acid Added, Lbs | 4,150 | 3,130 |
| Acid/Aluminum Weight Ratio | 0.385 | 0.388 |
| Acid Addition Rate, Lbs./Min | 12.9 | 23.7 |
| Acid Addition Rate, Lbs./Min./Lb. Aluminum | 0.0012 | 0.0029 |
| Crushing Strength of Spheres, Grams | 45–60 | 120 |

EXAMPLE II

To an aluminum digester containing 7000 pounds of undissolved aluminum pellets was added 3583 pounds of deionized water and 3130 pounds of 32% by weight hydrochloric acid. The resulting solution (referred to as "acid flush") was circulated through the digester for a period of about one hour, after which time said solution, now containing high molecular weight sol polymers, was removed to a depolymerization holding tank. Fresh aluminum pellets, in an amount of 1072 pounds, were added to the digester; the acid flush solution was removed from the holding tank and passed into the digester at a rate of 0.0029 pound of acid per minute per pound of aluminum. The aluminum/chloride weight ratio in the resulting alumina-sol was maintained below about 0.3 for a period of 3 hours.

When the aluminum concentration in the circulating stream had attained a level of about 13% to about 15% by weight of the total solution, the circulating stream was diverted into an alumina-sol holding tank. Water was then added to the digester in an amount sufficient to lower the aluminum concentration of the alumina-sol to the desired level. The water was circulated within the digester until the remaining undissolved aluminum pellets had been cleansed of residual alumina-sol, at which time the solution was diverted to the alumina-sol holding tank and intermixed with the alumina-sol therein.

The alumina-sol produced was formed into spherical particles by the oil drop method hereinbefore described. The sperical particles were of uniform size and shape, and of greater import, of uniform crushing strength of the order of 120 grams prior to being dried and calcined at elevated temperatures. There was no indication of a tendency for the alumina-sol to stratify into various layers, and there was no observance of a solid white material at the bottom of the sol. The data obtained during this operation are indicated in the table under the designation, "run B."

The foregoing examples and specification illustrate the method of the present invention, and clearly indicate the benefits to be afforded through the utilization thereof.

We claim as our invention:

1. In the process for the manufacture of an alumina sol containing combined chloride wherein aluminum is contacted with concentrated hydrochloric acid in an aluminum digestion zone, forming thereby alumina sol and high molecular weight sol polymers, the improvement which comprises separating alumina sol from undissolved aluminum particles and high molecular weight sol polymers within said digestion zone and removing the same from said zone, commingling with said undissolved aluminum particles and polymers hydrochloric acid at a rate in excess of that required to maintain the aluminum/chloride weight ratio of the resulting alumina sol below a level of about 0.3 for a period of from about 1 to about 6 hours, and circulating the resulting solution through said digestion zone.

2. The process of claim 1 further characterized in that the solution resulting from commingling the hydrochloric acid with the aluminum particles and the undissolved contents is circulated until the aluminum concentration thereof attains a level of about 13% to about 15% by weight of said solution.

3. In the process for the manufacture of an alumina sol containing combined chloride, wherein aluminum is contacted with concentrated hydrochloric acid in an aluminum digestion zone, forming thereby alumina sol and high molecular weight sol polymers, the improvement which comprises separating alumina sol from undissolved aluminum particles and high molecular weight sol polymers within said digestion zone and removing the same form said zone, separately removing said sol polymers and depolymerizing the same in a depolymerization zone, adding additional aluminum particles to said digestion zone, commingling therewith the depolymerization reaction products from said depolymerization zone and circulating the resulting solution through said digestion zone.

4. In the process for the manufacture of an alumina sol containing combined chloride, wherein aluminum is contacted with concentrated hydrochloric acid in an aluminum digestion zone, forming thereby alumina sol and high molecular weight sol polymers, the improvement which comprises separating alumina sol from undissolved aluminum particles and high molecular weight sol polymers within said digestion zone and removing the same from said zone, separately removing said sol polymers with a solution of hydrochloric acid and depolymerizing the same in a depolymerization zone, adding aluminum particles to said digestion zone, commingling therewith the depolymerization reaction products from said depolymerization zone at a rate in excess of that rate required to maintain the weight ratio of aluminum to chloride of the resulting alumina sol below a level of about 0.3 for a period of from about 1 to about 6 hours, circulating the resulting solution through said digestion zone until the aluminum concentration of the circulating stream attains a level of about 13% to about 15% by weight.

5. The process of claim 4 further characterized in that said aluminum/chloride weight ratio is maintained below a level of about 0.3 for a period of about 3 hours.

6. The process of claim 4 further characterized in that said digestion zone is maintained at a temperature within the range of about 80° F. to about 300° F.

7. The process of claim 4 further characterized in that said digestion zone is maintained under a pressure of from about 0 to about 35 p.s.i.g.

8. The process of claim 4 further characterized in that said undissolved aluminum particles are washed with water in an amount of 100% by weight of that required to lower the concentration of aluminum in the alumina sol to a level of about 12% by weight of said sol.

9. A process for the manufacture of alumina which comprises contacting metallic aluminum with concentrated hydrochloric acid in a digestion zone, separating alumina sol from undissolved aluminum and high molecular weight polymers within said digestion zone and removing the same from said zone, separately removing said sol polymers with a solution of hydrochloric acid and depolymerizing the same in a depolymerization zone, adding additional aluminum particles to said digestion zone, commingling therewith the depolymerization products from said depolymerization zone, immediately circulating the resulting solution through said digestion zone, and converting the resulting alumina sol, free from high molecular weight sol polymers, into alumina.

10. The process of claim 9 further characterized in that said alumina possesses a crushing strength in excess of about 65 grams prior to being dried and calcined at elevated temperatures.

11. The process of claim 10 further characterized in that the crushing strength of the alumina is within the range of from about 65 to 130 grams.

12. A process for the manufacture of alumina having a crushing strength within the range of from about 65 to about 130 grams, prior to being dried and calcined at elevated temperatures, which comprises contacting metallic aluminum with concentrated hydrochloric acid in a digestion zone, separating alumina sol from undissolved aluminum and high molecular weight sol polymers within said digestion zone and removing the same from said zone, separately removing said sol polymers, with a solution of hydrochloric acid, and depolymerizing the same in a depolymerization zone, adding additional aluminum particles to said digestion zone, commingling therewith the depolymerization reaction products from said depolymerization zone, circulating the resulting solution through said digestion zone, continuing said circulation until such time as the aluminum concentration of the circulating solution attains a level of about 13% to about 15% by weight, removing the resulting alumina sol free from said sol polymers and converting said alumina sol into alumina having a crushing strength of from about 65 to about 130 grams prior to being dried and calcined at elevated temperatures.

13. The process of claim 12 further characterized in that the depolymerization reaction products are added to the aluminum within said digestion zone in excess of a rate required to maintain the aluminum/chloride ratio of the resulting alumina sol below a level of about 0.3 for a period of about three hours.

References Cited in the file of this patent
UNITED STATES PATENTS
2,404,024    Bailie _____ July 16, 1946